(12) United States Patent
Bongiovanni et al.

(10) Patent No.: US 10,509,612 B2
(45) Date of Patent: Dec. 17, 2019

(54) THREE-DIMENSIONAL INFORMATION SYSTEM

(71) Applicant: TD Ameritrade IP Company, Inc., Omaha, NE (US)

(72) Inventors: Mike Bongiovanni, Omaha, NE (US); Sami Thessman, Omaha, NE (US); Domingo Ramos, Omaha, NE (US); Scott Galbraith, Omaha, NE (US); Joe McHeffey, Omaha, NE (US); Darah Rifkin, Omaha, NE (US); Adam Lassy, Omaha, NE (US); Sami Viitamaki, Omaha, NE (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 93 days.

(21) Appl. No.: 15/673,805

(22) Filed: Aug. 10, 2017

(65) Prior Publication Data

US 2019/0050189 A1    Feb. 14, 2019

(51) Int. Cl.
*G06F 3/14* (2006.01)
*G06F 3/041* (2006.01)
*G06Q 40/04* (2012.01)

(52) U.S. Cl.
CPC .......... *G06F 3/1423* (2013.01); *G06F 3/0412* (2013.01); *G06Q 40/04* (2013.01)

(58) Field of Classification Search
CPC ...... G06F 3/1423; G06F 3/0412; G06Q 40/04
See application file for complete search history.

(56) References Cited

U.S. PATENT DOCUMENTS 5,339,392 A    8/1994 Risberg et al.
5,371,854 A    12/1994 Kramer
(Continued)

FOREIGN PATENT DOCUMENTS

CA    2 287 691 A1    4/2001
EP    1 553 505 A1    7/2005
(Continued)

OTHER PUBLICATIONS

Interactive Brokers, "Beta Weighted Risk Navigator Webinar Notes," from https://www.interactivebrokers.com/en/?f=%2Fen%2Fgeneral%2Feducation%2Fpdfnotes%2FWN-BetaWeightedRiskNavigator.php, 19 pages, 2012.
(Continued)

*Primary Examiner* — Towfiq Elahi
(74) *Attorney, Agent, or Firm* — Harness, Dickey & Pierce, P.L.C.

(57) ABSTRACT

A three-dimensional display device is provided. The device includes a plurality of surfaces. At least one surface of the plurality of surfaces is configured to display data. The device also includes a receiver configured to receive data along with a circuit configured to determine a change in orientation of the display device. The device further includes a processor configured to receive a first market data, display the first market data on the at least one surface, and illuminate the plurality of surfaces in a first color when the first market data is above a first threshold. The processor is further configured to illuminate the plurality of surfaces in a second color when the first market data is below the first threshold and change an intensity of the first color or the second color based on a degree of change of the first data.

21 Claims, 10 Drawing Sheets

(56) References Cited

U.S. PATENT DOCUMENTS

| | | | |
|---|---|---|---|
| 5,553,218 A | 9/1996 | Li et al. | |
| 6,205,453 B1 | 3/2001 | Tucker et al. | |
| 6,801,199 B1 | 10/2004 | Wallman | |
| 7,642,730 B2 | 1/2010 | Dowling et al. | |
| 7,831,494 B2 | 11/2010 | Sloan et al. | |
| 7,873,622 B1 | 1/2011 | Karls et al. | |
| 7,917,868 B2 | 3/2011 | Ok et al. | |
| 8,082,203 B1 | 12/2011 | Mauro, Jr. | |
| 8,768,825 B2 | 7/2014 | Mauro, Jr. | |
| 9,015,632 B2 | 4/2015 | Toso | |
| 2002/0184237 A1 | 12/2002 | McFeely | |
| 2003/0120574 A1 | 6/2003 | Wallman | |
| 2004/0055447 A1 | 3/2004 | Childs et al. | |
| 2005/0055267 A1 | 3/2005 | Chasanoff et al. | |
| 2005/0071266 A1 | 3/2005 | Eder | |
| 2005/0094207 A1 | 5/2005 | Lo et al. | |
| 2005/0120293 A1 | 6/2005 | Benhase et al. | |
| 2005/0149428 A1 | 7/2005 | Gooch et al. | |
| 2005/0187851 A1 | 8/2005 | Sant | |
| 2005/0228735 A1 | 10/2005 | Duquette | |
| 2006/0229971 A1 | 10/2006 | Kelly | |
| 2006/0241949 A1 | 10/2006 | Tobias et al. | |
| 2007/0005477 A1 | 1/2007 | McAtamney | |
| 2007/0061746 A1 | 3/2007 | Folting et al. | |
| 2008/0171537 A1 | 7/2008 | Chiu | |
| 2008/0281761 A1 | 11/2008 | Egan | |
| 2009/0183103 A1 | 7/2009 | McCartie et al. | |
| 2009/0240120 A1* | 9/2009 | Mensinger | A61B 5/7445 600/301 |
| 2009/0259597 A1 | 10/2009 | Wallman | |
| 2010/0125534 A1 | 5/2010 | Brandes et al. | |
| 2010/0287113 A1 | 11/2010 | Lo et al. | |
| 2010/0293110 A1 | 11/2010 | Rosenthal et al. | |
| 2011/0251942 A1 | 10/2011 | Rosenthal et al. | |
| 2012/0030089 A1 | 2/2012 | Ram et al. | |
| 2012/0079431 A1* | 3/2012 | Toso | G06Q 40/06 715/836 |
| 2013/0080913 A1 | 3/2013 | Rodrig et al. | |
| 2013/0091462 A1* | 4/2013 | Gray | G06F 3/0346 715/810 |
| 2014/0129480 A1 | 5/2014 | LeRose et al. | |
| 2014/0181707 A1 | 6/2014 | Tamberg | |
| 2014/0215375 A1 | 7/2014 | Sauermann | |
| 2014/0250029 A1* | 9/2014 | Kato | G06Q 40/00 705/36 R |
| 2014/0304133 A1 | 10/2014 | La Roda, II | |
| 2015/0026095 A1 | 1/2015 | Ohana | |
| 2015/0120526 A1 | 4/2015 | Peterffy et al. | |
| 2015/0178841 A1 | 6/2015 | Wallman | |
| 2015/0242456 A1 | 8/2015 | Cannon et al. | |
| 2016/0041597 A1* | 2/2016 | Graham | G06F 1/3212 713/323 |
| 2016/0048922 A1 | 2/2016 | Stearns | |

FOREIGN PATENT DOCUMENTS

| | | |
|---|---|---|
| EP | 1 463 307 B1 | 8/2016 |
| KR | 10-2000-0058950 A | 10/2000 |
| WO | WO 2008/093981 A1 | 8/2008 |

OTHER PUBLICATIONS

Firstbridge, "Volatility & Beta Weighted Exchange Traded Funds (ETFs)," from http://www.firstbridgedata.com/img/file/Volatility%20Weighting%20-%20Retail.pdf, 8 pages, 2011.

Google, "Finance Help," from https://support.google.com/finance/?hl=en, 10 pages, printed Jan. 18, 2018.

Tibco, "How to Use the Table," from https://docs.tibco.com/pub/spotfire/7.0.1/doc/html/table/table_how_to_use.htm, 2 pages, 2016.

Oracle, "Enterprise PeopleTools 8.50 People Book: Using PeopleSoft Applications," from https://docs.oracle.com/cd/E15645_01/pt850pbr0/eng/psbooks/tupa/chapter.htm?File=tu pa/htm/tupa06.htm, 16 pages, 1988.

Kickstarter, "Cuberox—six-screen waterproof linux-powered computer," from https://www.kickstarter.com/projects/1426448868/cuberox-six-screen-waterproof-linux-powered-comput, 22 pages, 2014.

Rag Kandala, "Tangible Stock Exchange," from http://cargocollective.com/ragkandala/Tangible-Stock-Exchange, 6 pages, printed Jan. 18, 2018.

Janata, Petr and Edward Childs, "MarketBuzz: Sonification of Real-Time Financial Data"; Proceeding of ICAD 04—Tenth Meeting of the International Conference on Auditory Display, Sydney, Australia, Jul. 6-9, 2004. Dartmouth College, 2004. (7 pages).

Livio, Mario, "The Golden Ratio", Broadway Books, (2002), 3 pgs., United States of America.

* cited by examiner

THREE-DIMENSIONAL INFORMATION SYSTEM

FIELD OF THE INVENTION

The embodiments presented herein are generally directed towards display devices and more specifically towards a three-dimensional information system.

BACKGROUND

Data is conventionally displayed through two-dimensional displays such as televisions, monitors, or screens of computational devices such as cellular phones, laptops, or tablets. However, conventional two-dimensional displays are limited in the manner in which they can provide information besides simply displaying it. Such displays also cannot provide contextual information for the displayed data. Systems and methods are provided herein to overcome these deficiencies.

BRIEF DESCRIPTION OF THE DRAWINGS/FIGURES

DETAILED DESCRIPTION OF THE INVENTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For the purposes of this discussion, the term "processor" or "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor. The systems and devices described herein may each include processor or processor circuitry to implement the embodiments presented herein.

Figure 1:
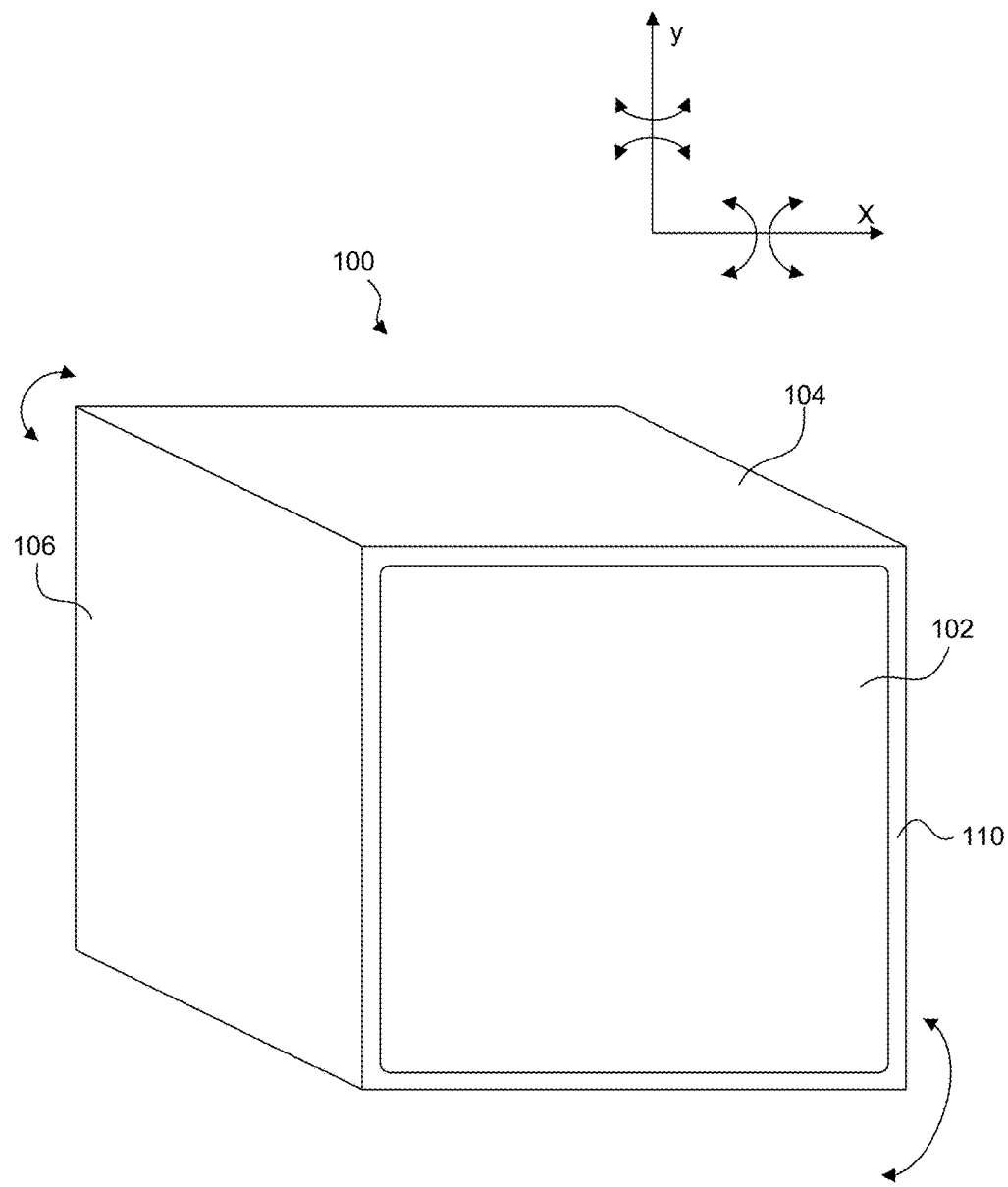
FIG. 1 illustrates an example three-dimensional device to provide information according to an embodiment of the disclosure.

FIG. 1 illustrates an example three-dimensional device 100 to provide information according to an embodiment of the disclosure. In FIG. 1, device 100 is a shaped as a cube. While device 100 may comprise a cube as illustrated in FIG. 1, in alternate embodiments device 100 may be any other three-dimensional shape such as a pyramid, dodecahedron, polygon, tetrahedron, cone or a rectangular solid.

Device 100 has six surfaces with surface 102, surface 104, and surface 106 being illustrated. In an example, each of the surfaces of device 100 can be illuminated, either individually or collectively in a luminous light of any color. In another example, each surface of device 100 may be illuminated except for surface 102 which only displays data. Surfaces of device 100 that display data may be referred to as "display surfaces" and surfaces of device 100 that do not display data may be referred to as "non-display surfaces" herein. Data as described herein includes any kind of graphical, non-graphical, numeric, color, or textual data. In an example, any of the six surfaces of device 100 can display data.

According to an embodiment of the disclosure, flipping, twisting, turning and/or tilting device 100 along either of the X or Y axes may cause displayed data and/or illumination of one or more surfaces to change as will be described further below. Device 100 is a physically tangible device as opposed to a virtually displayed device.

Figure 2:
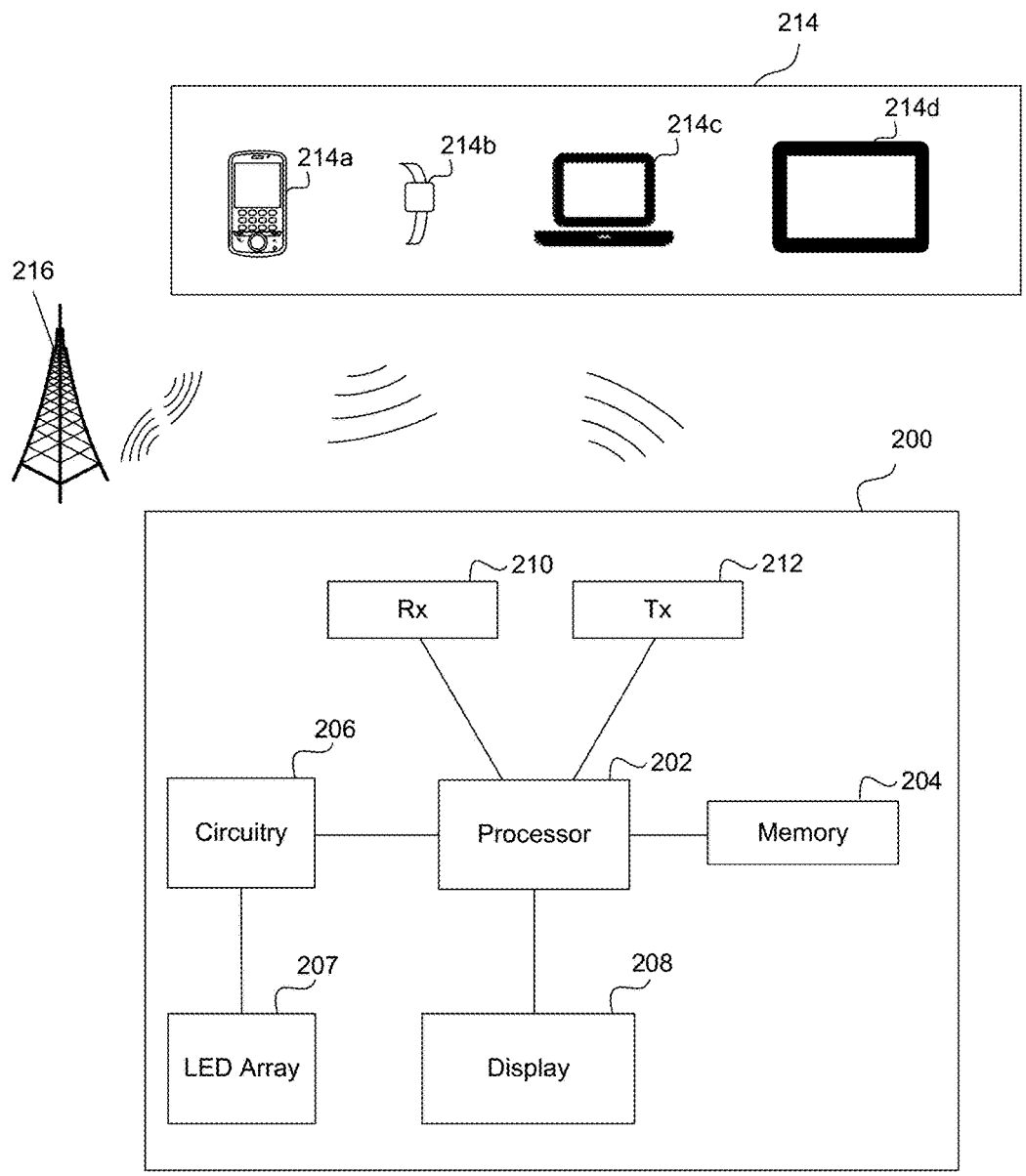
FIG. 2 illustrates an example system internal to the three-dimensional device according to an embodiment of the disclosure.

FIG. 2 illustrates an example system 200 that is internal to device 100.

System 200 includes a processor 202 that is coupled to a memory 204, receiver circuitry 210, transmitter circuitry 212, circuitry 206, and display 208. Display 208 may be, for example, one or more of circuitry or materials that can display data including but not limited to a Liquid Crystal Display (LCD), Light Emitting Diode (LED) display, Organic Light Emitting Diode (OLED) or Active Matrix Organic Light Emitting Diode (AMOLED) panels that may be affixed to or comprise part of one or more of the six surfaces of device 100. For example, display 208 or part of display 208 may be affixed to or comprise all or part of surface 102 of device 100. Circuitry 206 may illuminate one or more surfaces of device 100 in a light of a particular color and intensity. Circuitry 206 may illuminate the surfaces of device 100 using, for example, a light emitting source such as an LED array 207. The colors of the LED may be adjustable by a user. In an example, one or more surfaces of device 100 may be translucent so as to allow light from one or more LEDs to illuminate the one or more surfaces.

In an example, processor 202, based on instructions stored in memory 204, performs some or all of the functions described herein. Receiver circuitry 210 and transmitter circuitry 212 receive or transmit data respectively either through a wired or wireless interface with an electronic device 214 or with a cellular communications tower 216. Electronic device 214 may be any computational device such as cellular phone 214a, electronic watch 214b, laptop or computer 214c, or tablet 214d. Receiver circuitry 210 or transmitter circuitry 212 may connect wirelessly using any wireless protocol such as Bluetooth or wireless local area network (WLAN) or cellular communications protocol to receive or transmit data.

In an example, processor 202 receives data via receiver circuitry 210. The data may be, for example, any type of data associated with a stock market. The data may include trade triggers, alerts for buying or selling a stock or if a value of a stock of stock index is above or below a threshold, stock watch lists, equity Initial Public Offering (IPO) alerts, stock indices alerts, market alerts, bond alerts, account alerts, account data, or fixed income new issue alerts. The stock market data may be information related to a stock market index such as the Dow Jones Industrial Average (DJIA), the Standard and Poor (S&P) 500, or the National Association of Securities Dealers Automated Quotations (NASDAQ). Processor 202 may also receive data about stock tickers of various publicly traded corporations. The data may be from either a U.S. or a foreign stock exchange or from a financial institution such as a bank or brokerage. In an example, the data may be private data associated with a financial, investment, or banking account of a user. For example, the data may provide information for stocks owned by the user, an account balance, funds available for trading, cash balances, or a margin balance. Such private data may be received and/or displayed only upon authentication of the user's account.

Authentication may be through any form of authentication such as password entry (via a touch sensitive screen), tilting the device in a defined sequence, authentication token exchange, cryptographic keys, or biometric sensors such as fingerprint, voice, or iris sensors. The device 100 could be equipped with a camera to allow certain biometric authentication. Further, in an example, there is an authenticated and un-authenticated state. In the authenticated state device 100 may display private user data and in the un-authenticated state device 100 may display public data. In an example, an authentication might time out after a pre-determined period of time and device 100 will change state from authenticated to un-authenticated state. In an example, device 100 may use gestural combinations for authentication. In another example, voice authentication may be used to authenticate a user. For example, a three-dimensional gesture method by the user for authentication may be verified to unlock device 100. In an example, when device 100 is placed down it goes back to sleep and may be placed in an un-authenticated state. In yet another embodiment, the device may be authenticated wirelessly via another device (e.g., a cell phone). It is to be appreciated by persons of skill in the art that the type of authentication is a design choice and may be arbitrary.

Data related to a user's account, such as data for a particular stock owned by the user may be displayed as a graph, text, or chart of the stock's performance over customizable time periods (such as days, weeks, months, years). The data may also indicate a profit or a loss for a user that may be displayed as either a percentage loss or gain or a numeric value of the loss or gain. In an embodiment, the display on each surface can be customized by the user.

The data displayed may be any kind of data and is not limited to financial data. For example, the data may be sports related data. The data may indicate games scores or statistics for a sports team such as the Nebraska Cornhuskers™ or the Chicago Cubs™. If a selected team is winning, then the score may be displayed in green by device 100 and one or more surfaces may be illuminated in green. If a selected team is losing then the score may be displayed in red by device 100 and one or more surfaces may be illuminated in red. In an example, one or more surfaces of device 100 may be illuminated by one or more of a team's colors when the team scores.

In a further example, the data displayed may be weather related data. For example, device 100 may display weather related data on one or more surfaces. The data may also be storm related alerts such as when a storm is within a certain radius of device 100. The alerts may be customized to display in different colors based on the a level of the alert.

In another example, the data may be related to auctions. For example, if a user is bidding on an auction item the data may provide an alert when the user has been outbid for the auction item or when the user has won or lost the auction.

In another example, device 100 may also interface wirelessly with other devices 214 to receive and display social media data from social media sites, for example, Twitter. Device 100 may be programmed to display educational or coaching data such as inspiring quotes, information about upcoming webinars or classes. Device 100 may also be able to receive data for a user's calendar and display alerts for upcoming meetings or events. Device 100 may also be able to display emojis or icons. Upon receiving the data, processor 202 provides the data to display 208 for display on at least one surface of device 100. For example, the data may be displayed on surface 102 of device 100. In addition, processor 202 may send a signal to circuitry 206 to illuminate one or more non-display surfaces of device 100. For example, if data is being displayed on surface 102, the cube may illuminate one or more of the remaining five surfaces of device 100 in a light of a particular color. The color and intensity of the illumination may be based on the type and status of the data. For example, if the data indicates that a stock ticker or a stock market index is up for the day, then processor 100 sends a signal to display circuitry 208 to display the data on surface 102 and to illuminate each of the remaining surfaces of device 100 in green to indicate the upward trend of the data. Similarly, if the data indicates that a stock ticker or a stock market index is down for the day, then processor 202 sends a signal to display circuitry 208 to display the data on surface 102 and illuminate each of the remaining five surfaces of device 100 in red to indicate the downward trend of the data. In an example, surface 102 may both display data and be illuminated in a color corresponding to the data. In another example, surface 102 may display data and the area 110 surrounding surface 102 may be illuminated in a color corresponding to the data displayed.

In an example, it is determined whether the data is in an upward or downward trend based on whether the data is above or below a threshold closing level data from a previous trading session. For example, if the DJIA closed at 12000 on a previous trading session and is currently at 12001, then it is determined to be in an upward trend. If the DJI is at 11999, then it is determined to be in a downward trend. If the data switches from the upward trend to a downward trend during a trading session, then the illumination of the surfaces is changed to match the changing trend of the data.

In an example, processor 100 changes an intensity of the illumination of the colors based on a degree or rate of change of the data. For example, if the received data is rising at a first rate, then the intensity of a green color illuminating the surfaces of device 100 is increased proportional to the first rate. For example, if a numeric value of the data is increasing rapidly, then the illuminated color of the surfaces change to more intense shades of green and if the data is decreasing rapidly then the illuminated color of the surfaces changes to more intense shades of red. According to an embodiment of the disclosure, the colors are not limited to red or green. Different colors can be associated with different types of data by programming processor 202 based on instructions stored in memory 204. In an example, a user can set the colors based on their personal preferences.

According to an embodiment, circuitry 206 includes an accelerometer or gyro that can determine a change in orientation of device 100. For example, if device 100 is flipped or tilted or rotated along one of the axes of a Cartesian coordinate system, then a signal is sent from circuitry 206 to processor 202 indicating the change in the orientation of device 100. When the orientation is changed, processor 202 displays a different set of data on surface 102 of device 100. For example, initially surface 102 may display stock market news. Upon turning the cube onto surface 106, surface 102 may display a different set of data, for example, a stock market index. Similarly, if device 100 is tilted upwards or downwards along a Y-axis, surface 102 displays a different set of data. For example, surface 102 may display private data associated with a stock portfolio of a user when device 100 is tilted upwards or downwards along the Y-axis. In an example, one or more surfaces of device 100 may display data even if device 100 is not touched, moved, or rotated. Data displayed may be static or dynamic. For example, text from an email, news article, or alert message does not change and is considered static. In contrast, data for a stock market index or stock market ticker symbol is considered dynamic while the stock market is open and is considered static when the stock market is closed. Static data may be associated with a particular color such as white. Dynamic data may be associated with a different set of colors, for example when the data is in an upward trend for a time period it may be displayed in green and when the data is in a downward trend for a time period it may be displayed in red.

Circuitry 206 may also detect tactile contact of a user with at least one surface of device 100. Based upon the tactile contact, the circuitry 206 may activate one or more surfaces of device 100 to either illuminate or display data. By activating the cube only upon tactile contact, circuitry 206 conserves a charge of a battery or other power source (not shown) that powers the cube. For example, if the device 100 is picked up it becomes active and if it is placed down it may become inactive after a predetermined period of time. In an example, device 100 may be compatible with If This Then That (IFTTT) applications. In an embodiment, device 100 may automatically power down if no input is received, tactile or otherwise, for a pre-determined period of time. In an example, the period of time is programmable by a user. In another example, device 100 may power up when the stock market opens and power down when the stock market closes. Alternatively, device 100 may power up when another device is in range (e.g., a person's cell phone). A surface of device 100 may be a touch screen surface that can receive tactile input from a user. For example, the surface may receive tactile input that allows a user to enter a password or biometric identification such as a fingerprint. The password may be received by the processor 202 and authenticated in order to activate the cube to receive data via receiver circuitry 210 or display the received data via display 208. As described above, gesture or motion authentication may also be used to authenticate a user. Gesture or motion data may also be used to input data into device 100, or to toggle between sources of data, or the type of data received by device 100, for example different accounts, stock symbols, handles, etc.

Receiver circuitry 210 can detect a wireless signal from an electronic device 214 and activate at least one surface of device 100 to illuminate or display data in response to the wireless signal. For example, receiver circuitry 210 may receive or detect a wireless signal such as a Bluetooth signal from an electronic device 214, and upon receiving the signal, send a signal to processor 202. In response to the signal from receiver circuitry 210, processor 202 sends a signal to display 208 to display either received or pre-stored data, for example, on surface 102 of device 100. Processor 202 may also send a signal to circuitry 206 to illuminate one or more surfaces of device 100 in a color and intensity associated with the displayed data.

In an example, receiver circuitry 210 may receive an authentication token from an electronic device 214. Device 100 may activate and display received data only upon completing an authentication process that is based on the authentication token. In an embodiment, if no authentication token is received, then the cube may display generic publicly available data such as stock market news, a stock market index, or a stock ticker symbol. Upon receiving an authentication token, the cube may display private information associated with an account of a user such as a stock ticker symbol for a stock owned by the user and the percentage gain or loss for the user for the particular stock.

In an example, circuitry 206 detects when a rate of movement of device 100 is at a rate above a threshold and change the data displayed on at least one surface of the cube when the rate is above the threshold. For example, circuitry 206 may include an accelerometer that can detect when the cube is being shaken by a user. Upon detecting when a rate of movement of the device 100 is at a rate above the threshold, circuitry 206 sends a signal to processor 202 to change the data being displayed on the one or more surfaces of device 100. In an example, the data may change from information on a first stock ticker symbol to information on a second stock ticker symbol.

In an example, processor 202 changes data displayed on one or more surfaces of device 100 at periodic intervals. For example, processor 202 may be programmed to switch the display on a surface of device 100 every five seconds. In another example, the processor may be configured to change the data displayed on a surface of device 100 in response to receiving a wireless signal from the electronic device.

A surface of device 100, for example surface 102, may display a stock index along with a symbol of a stock market that is associated with the stock index. For example, if a stock index corresponds to a U.S. stock market index such as the Dow Jones Industrial Average, then a U.S. flag symbol or text indicating the stock index such as "DJIA" may be displayed along with data on the stock index. Similarly for stock ticker symbols, the cube may display a symbol such as a flag of the country associated or a stock index associated with the stock ticker symbol. In another example, the processor 100 may display a countdown timer that counts down an amount of time until a stock market associated with the stock index or stock ticker symbol closes.

In an embodiment, processor 202 sends a signal to display circuitry 208 to illuminate one or more surfaces of device 100 in a pulsing light of a predetermined color when the stock market is within a predetermined period of time of closing. For example, one or more surfaces of device 100 may be illuminated in a pulsing light 15 minutes before a selected stock market closes for the day.

Processor 202 may also send a signal to circuitry 206 which includes one or more circuits that vibrate device 100 or generate a sound when a selected stock ticker symbol or stock index increases or decreases at a predetermined rate or crosses a predetermined threshold. For example, if a stock index or a stock ticker symbol is rising or falling at a preprogrammed rate or crossing a predetermined threshold, then the processor may vibrate device 100 or play a sound. Processor 202 may also send a signal to circuitry 206 to illuminate one or more surfaces of device 100 in a particular color or illuminate one or more surfaces of device 100 in a flashing color when a stock market index or a stock ticker symbol is rising or falling at a preprogrammed rate or crossing a predetermined threshold. Other examples of display types and auditory indicators are described in U.S. patent application Ser. No. 13/857,034, filed Apr. 4, 2013, which is incorporated herein by reference in its entirety.

In a further example, processor 202 sends a signal via transmitter circuitry 212 to an electronic device 214 when a stock market index or stock ticker symbol increases or decreases at the preprogrammed rate or crosses a predetermined threshold. The signal may causes the electronic device 214 to provide an indication, such as displaying a notification banner on electronic device 214 or generating a sound on electronic device 214.

In an example, receiver circuitry 210 detects when an electronic device 214 is within a predetermined proximity of device 100 and sends a signal to processor 202 to authenticate the electronic device 214 in order to receive and display data from electronic device 214. For example, receiver circuitry 210 may include a sensor such as a Bluetooth, Radio Frequency Identification (RFID), or Near Field Communication (NFC) sensor that may detect when an electronic device 214, such as cell phone 214*a* or electronic watch 214*b*, is proximate to device 100 and activate the device 100 via an authentication process with the electronic device 214. Upon authentication, receiver circuitry 210 may receive data to be displayed on one of the surfaces of device 100.

In an embodiment, processor 100 may receive data such as news and display it on one or more surfaces of device 100. Processor 202 may be configured to illuminate one or more surfaces of device 100 in a color that associated with news. In an example, once news articles or an alert is viewed on device 100 it may be deleted. Unread alerts may be deleted at next market open. Examples of types of data that can displayed one or more surfaces of device 100 will be described in further detail with respect to FIGS. 3-9 below.

Figure 3:
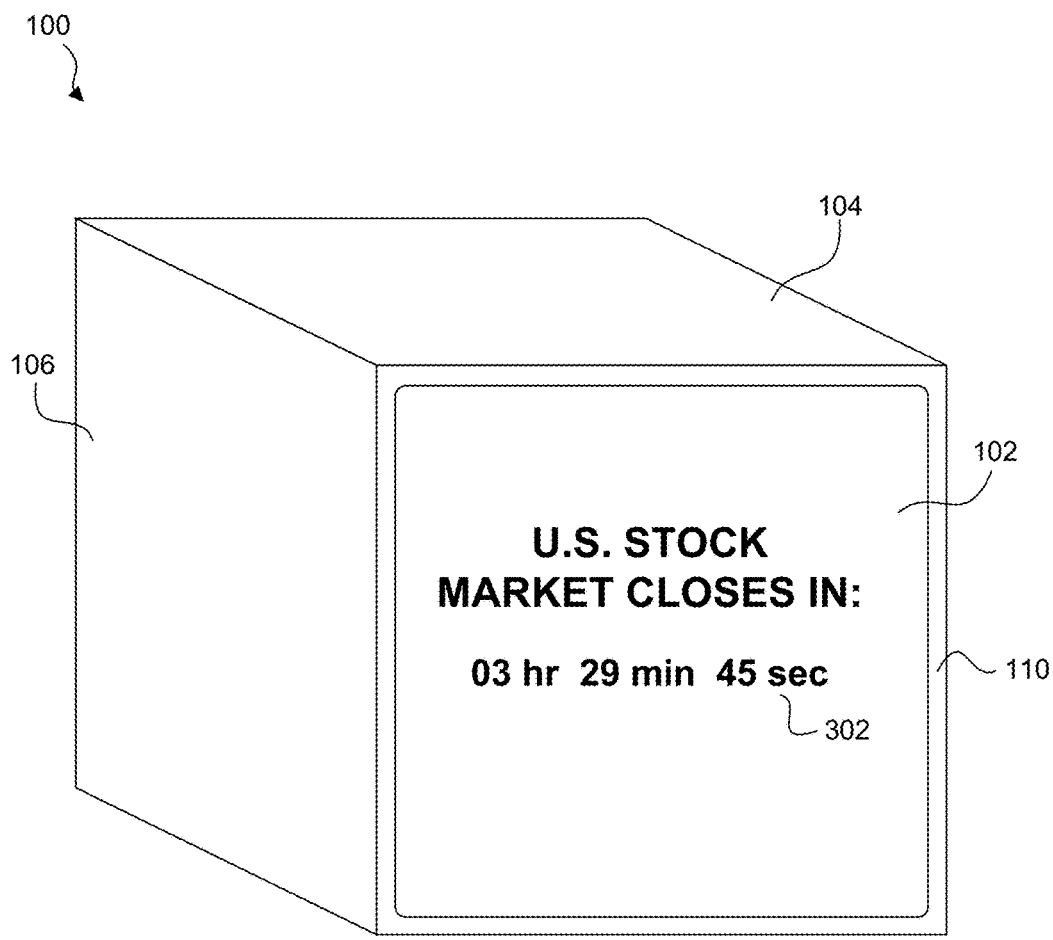
FIGS. 3-9 illustrate examples of information conveyed through the three-dimensional device according to embodiments of the disclosure.

FIG. 3 illustrates an example of data displayed on a surface of device 100. In FIG. 3, surface 102 of device 100 displays a countdown timer 302. Countdown timer 302 indicates an amount of time until the U.S. stock market closes for the day. Surfaces of device 100 other than surface 102, such as surface 104 and surface 106, may be illuminated in color associated with a countdown timer e.g. the color white. A user can customize the display to show a countdown timer for more than one stock market. For example, the display can be customized to show countdown timers for the U.S. stock market and/or the Japanese stock market.

Figure 4:
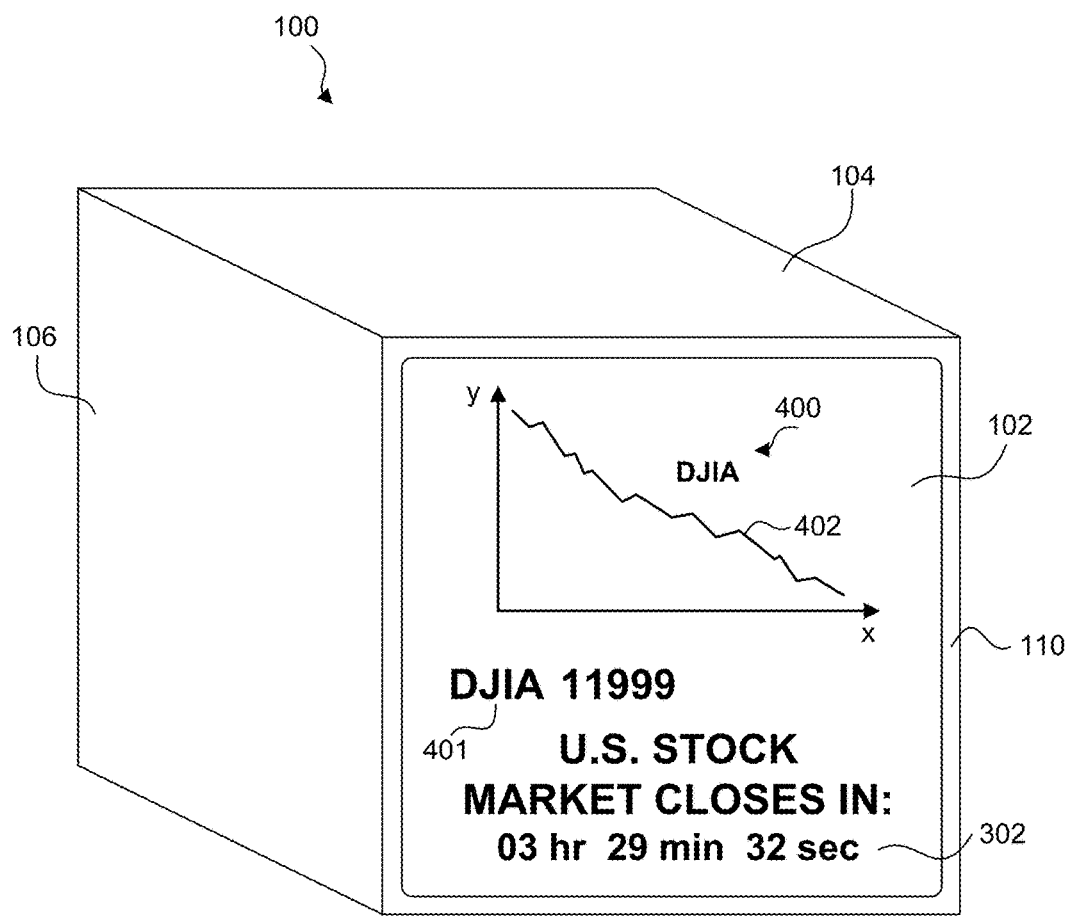

FIG. 4 illustrates another example of data displayed on device 100. In FIG. 4, in addition to the countdown timer 302, surface 102 displays a graph 400 that indicates whether a stock market index such as the DJIA is up or down for a particular period. The X-axis represents a user customizable time period such as minutes, hours, days, weeks, or years. The Y-axis represents an absolute value for the DJIA stock index. Since the graph 400 indicates that the DJIA is currently down, line 402 may displayed in red to show a downward trend. Since the DJIA is currently in a downward trend, surfaces other than surface 102 of device 100 may be illuminated in red to indicate that the market is down. For example, surfaces such as surface 104 and 106 may be illuminated in red. In another embodiment, every surface of device 100 including surface 102 may be illuminated in red.

While the embodiments described herein may display a line-type graph for stock indices or stock market ticker symbols, it is to be appreciated by persons of skill in the art that any type of graphical representation, such as bar, candlestick, open-high-low-close (OHLC), or point and figure charts, may be used. The type of chart may be customizable by a user. In addition, a user may be able to customize the value displayed on the X or Y axis of a chart. In an example, a current value of the stock market index or stock market ticker symbol may be displayed with or without an associated chart. The value may be displayed in green if it is up for the day and in red if it is down for the day. For example, in FIG. 4, the number 11999 is displayed next to DJIA 401 to indicate a current value for the DJIA. The number 11999 is displayed in red to indicate that the DJIA is currently down for the day.

Figure 5:
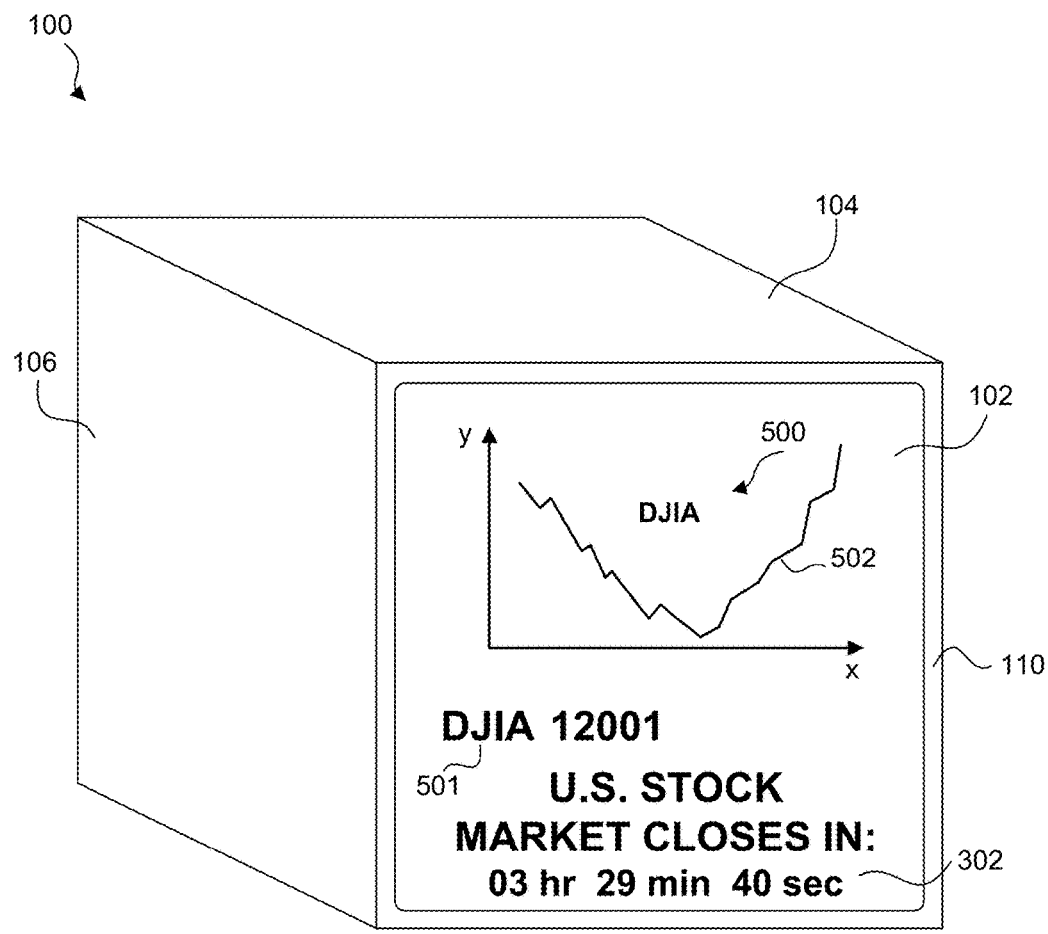

FIG. 5 illustrates a further example of data displayed on device 100 according to an embodiment of the disclosure. In this example, graph 500 indicates that the DJIA is currently up for the day. Line 502 is illuminated in green to indicate that the Dow Jones Industrial Average is currently up for the day. Since the Dow Jones Industrial Average is currently up, surfaces other than surface 102, such as surface 104 and 106, may be illuminated in a green. In another embodiment, every surface of device 100 including surface 102 may be illuminated in green. For example, in FIG. 5, the number 12001 is displayed next to DJIA 501 to indicate a current value for the DJIA. The number 12001 is displayed in green to indicate that the DJIA is currently up for the day.

Figure 6:
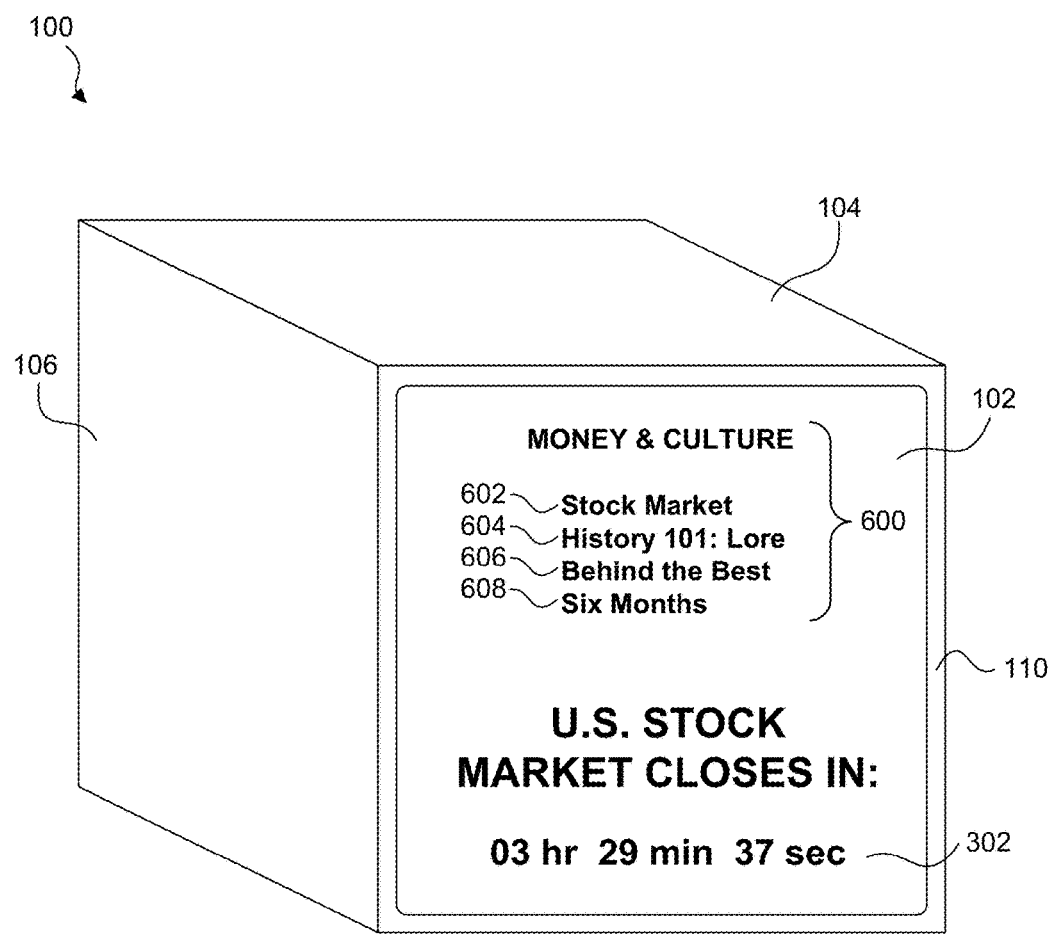

FIG. 6 illustrates a further example of data displayed using device 100. In the example in FIG. 6, surface 102 illustrates data 600 in addition to countdown timer 302. In the present example, data 600 is news of the stock market. Since data 600 is not associated with a rising or a falling stock index or stock ticker symbol, the non-display surfaces of device 100, such as surface 104 or 106, may be illuminated in a white light. In an example, each of the displayed lines in data 600 such as "stock market" 602, "history 101: Lore" 604, "Behind the Best" 606, and "Six Months" 608 may be links that can be selected via tactile touch to display further information associated with the links such as text of a news article.

Figure 7:
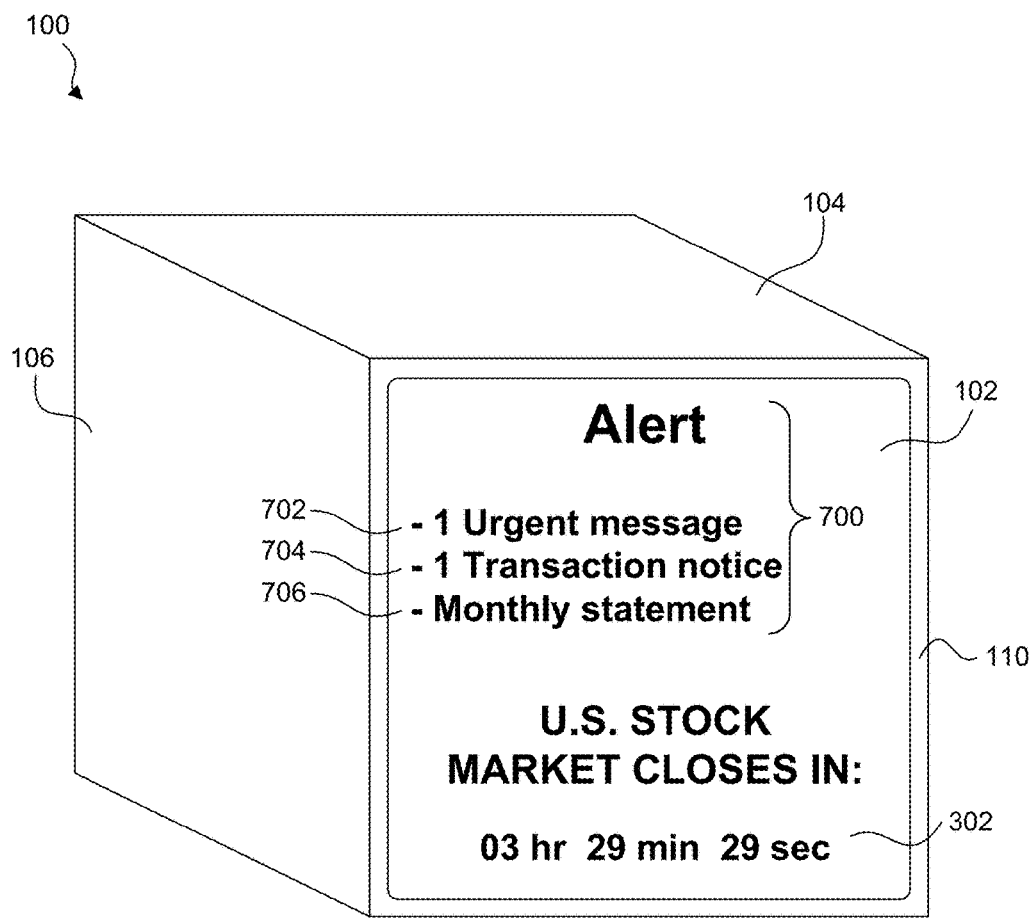

FIG. 7 illustrates a further example of data displayed using device 100. In the example in FIG. 7, data 700 is private data associated with an account of a user. Data 700 may be displayed upon authentication of the user's account. For example, authentication may be via entry of a password or via authentication with an electronic device 214. In an example, messages in data 700 may be displayed in different colors based upon content of the messages. For example, message 702 may be displayed in red, whereas messages 704 and 706 may be displayed in green. Each of the messages, 702, 704, and 706 may be clickable links that, upon receiving a tactile input from a user, display further information related to the message. Upon clicking a message displayed in a color, the non-display surfaces of the cube may be illuminated in that color. For example, if the "1 Urgent message" 702 is selected by a user via tactile input, non-display surfaces such as surface 104 and surface 106 may be illuminated in red. In another example, if "Transaction notice" 704 is selected, then non-display surfaces may be illuminated in green.

Figure 8:
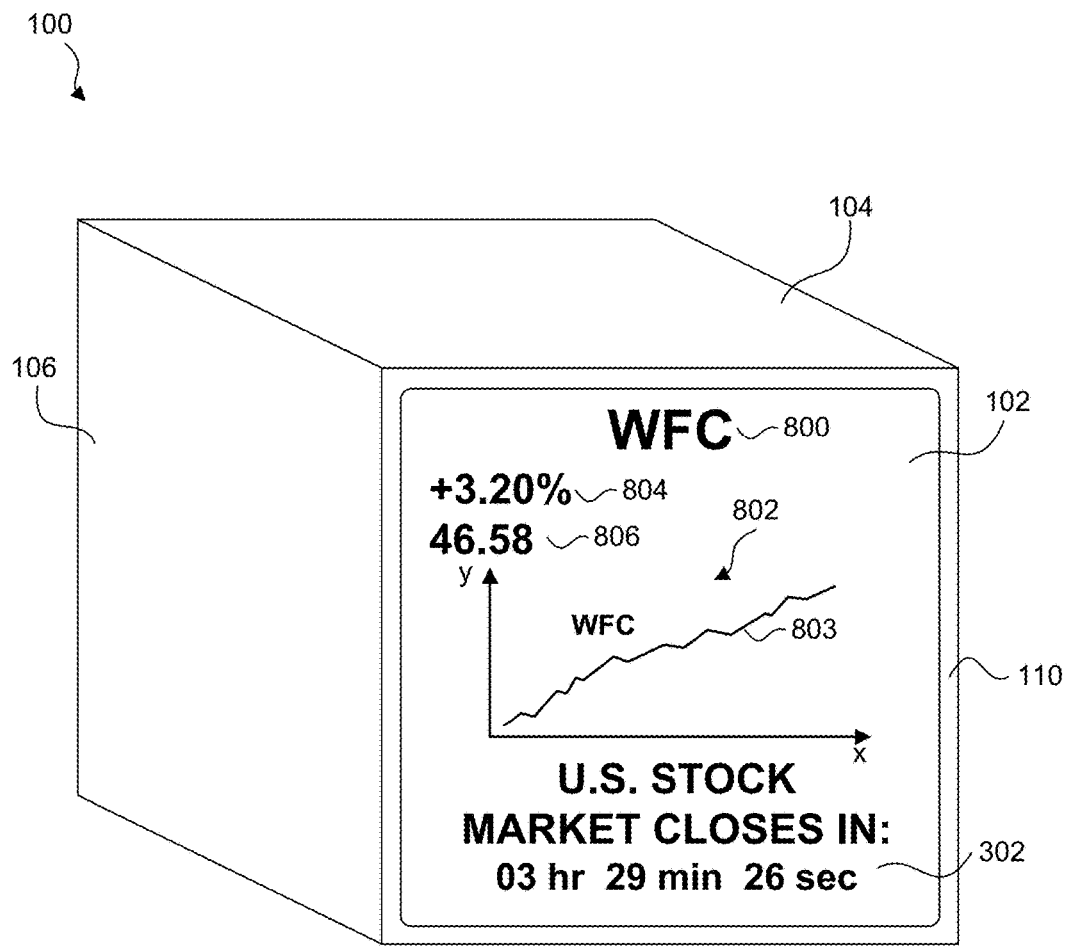

FIG. 8 illustrates an example of stock data displayed using device 100. In the example in FIG. 8, surface 102 of device 100 displays a stock ticker associated with an account of a user that has been authenticated by processor 202. For example, a user's account may be associated with Wells Fargo stock indicated by the stock ticker symbol WFC 800. Percentage 804 displays a percentage by which WFC is up or down compared to a threshold. The threshold may be, for example, a previous trading session's close or a price at which a user purchased the WFC stock. Stock price 806 may indicate an absolute value by which the WFC stock is up or down or a value by which the WFC stock is up or down when compared to a purchase price by a user. Graph 802 indicates whether WFC is up or down compared to the threshold. Graph 802 indicates that WFC is currently up. Since WFC is currently up, the stock ticker symbol WFC 800, line 803, the percentage 804, and stock price 806 are displayed in the color green. Non-display surfaces such as surface 104 and surface 106 may be illuminated in a green light to indicate that WFC is up.

Figure 9:
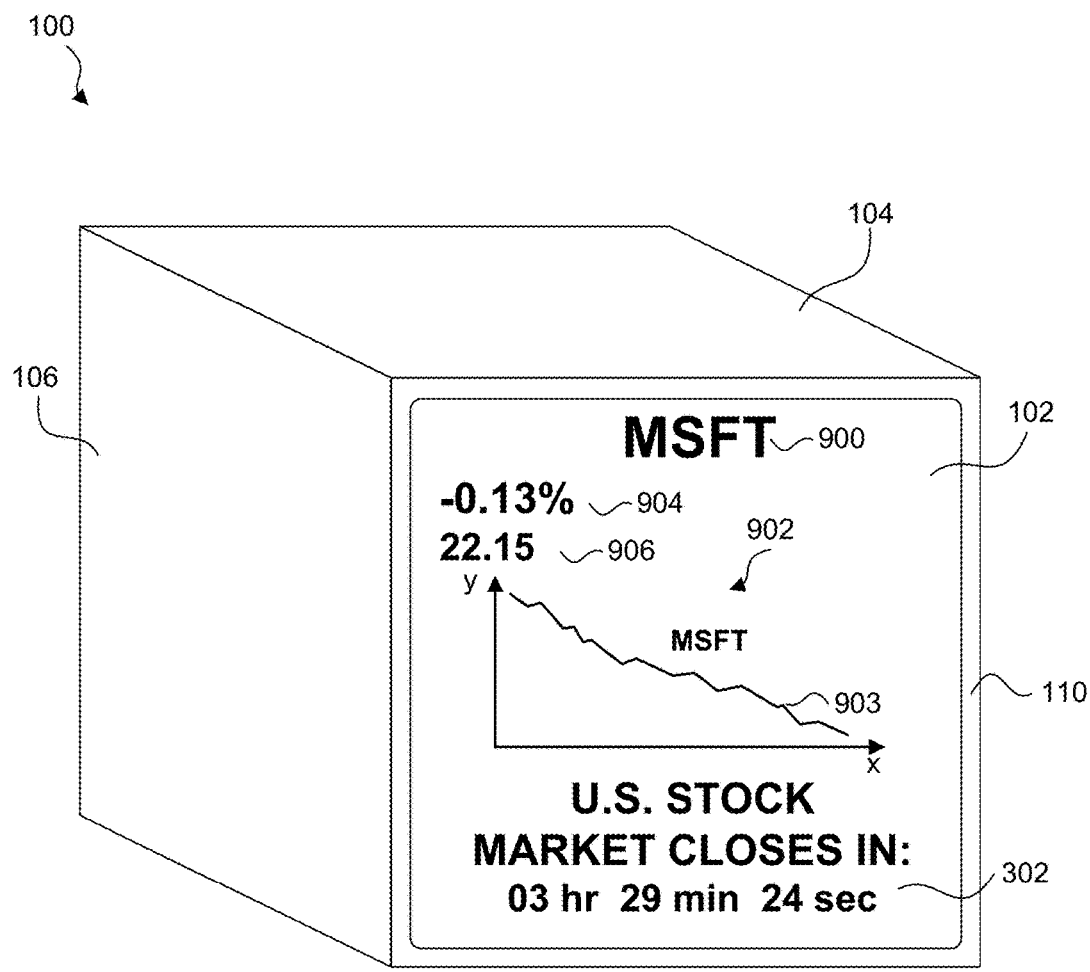

FIG. 9 illustrates a further example of stock data displayed using device 100. Surface 102 displays the stock ticker symbol MSFT 900 for Microsoft. Graph 902 indicates that MSFT 900 is currently down compared to a threshold. The threshold may be a previous day's closing price for MSFT 900 or a price at which a user purchased the MSFT stock. When the Microsoft stock is down, the ticker symbol MSFT 900, line 903, a percentage 904, and a stock price 906 for MSFT 900 are displayed in the color red. Since the stock for Microsoft stock is currently down, the non-display surfaces of device 100, such as surface 104 and surface 106, may also be illuminated in the color red.

Figure 10:
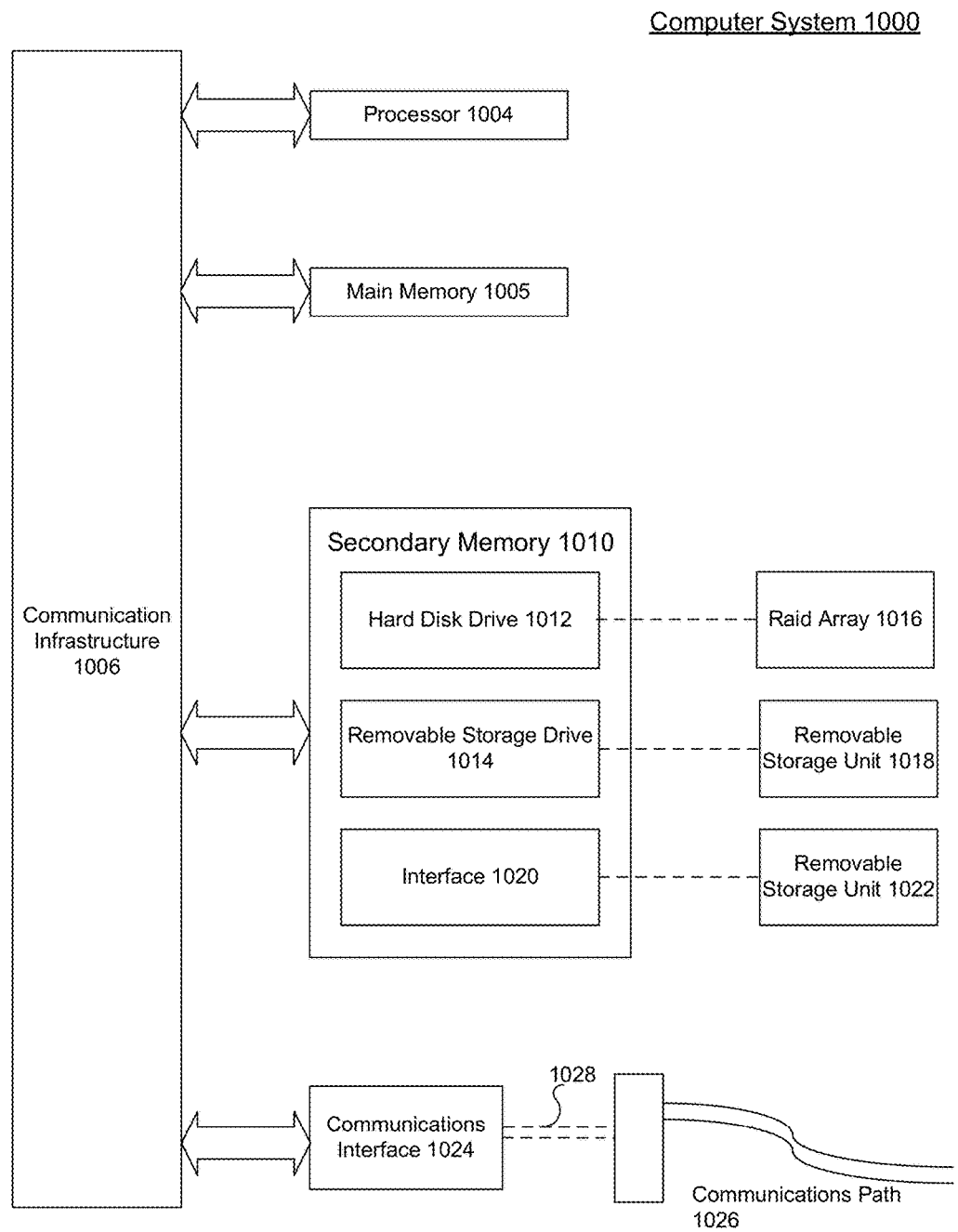
FIG. 10 illustrates an example computer system to implement embodiments disclosed herein.

The following describes a general-purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 1000 is shown in FIG. 10. The computer system 1000 includes one or more processors, such as processor 1004. Processor 1004 can be a special purpose or a general-purpose digital signal processor. Processor 1004 may be, for example, processor 202. The processor 1004 is connected to a communication infrastructure 1006 (for example, a bus or network). Various software implementations are described in terms of this exemplary computer system. After reading this description, it will become apparent to a person skilled in the relevant art how to implement the disclosure using other computer systems and/or computer architectures.

Computer system 1000 also includes a main memory 1005, preferably random access memory (RAM), and may also include a secondary memory 1010. The secondary memory 1010 may include, for example, a hard disk drive 1012, and/or a RAID array 1016, and/or a removable storage drive 1014, representing a floppy disk drive, a magnetic tape drive, an optical disk drive, etc. The removable storage drive 1014 reads from and/or writes to a removable storage unit 1018 in a well-known manner. Removable storage unit 1018 represents a floppy disk, magnetic tape, optical disk, etc. As will be appreciated, the removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software (i.e., instructions) and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCMCIA slot and card, etc., that are coupled to a communications path 1026. The communications path 1026 can be implemented using wire or cable, fiber optics, a phone line, a cellular phone link, an RF link and other communications links or channels.

The terms "computer program medium" and "computer usable medium" are used herein to generally refer to media such as removable storage drive 1014, a hard disk installed in hard disk drive 1012, or other hardware type memory. These computer program products are means for providing or storing software (e.g. instructions) to computer system 1000.

Computer programs (also called computer control logic) are stored in main memory 1005 and/or secondary memory 1010. Computer programs may also be received via communications interface 1024. Such computer programs, when executed, enable the computer system 1000 to implement the present disclosure as discussed herein. In particular, the computer programs, when executed, enable the processor 1004 to implement the processes and/or functions of the present disclosure. For example, when executed, the computer programs enable processor 1004 to implement part of or all of the steps described herein. Where the disclosure is implemented using software, the software may be stored in a computer program product and loaded into computer system 1000 using raid array 1016, removable storage drive 1014, hard drive 1012 or communications interface 1024.

In other embodiments, features of the disclosure are implemented primarily in hardware using, for example, hardware components such as Application Specific Integrated Circuits (ASICs) and programmable or static gate arrays or other state machine logic. Implementation of a hardware state machine so as to perform the functions described herein will also be apparent to persons skilled in the relevant art(s).

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not Abstract section, is intended to be used to interpret the claims. The Abstract section may set forth one or more but not all exemplary embodiments of the present disclosure as contemplated by the inventors, and thus, is not intended to limit the present disclosure and the appended claims in any way.

The embodiments presented herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A three-dimensional display device, comprising:
    at least three surfaces, wherein a first surface of the at least three surfaces is configured to display data;
    a receiver that receives market data;
    circuitry configured to determine a change in orientation of the display device and generate a signal in response to determining the change in orientation of the display device; and
    a processor configured to:
        receive first market data;
        display the first market data on the first surface of the at least three surfaces;
        illuminate a second surface and a third surface of the at least three surfaces in a first color when the first market data is above a first threshold;
        illuminate the second surface and the third surface of the at least three surfaces in a second color when the first market data is below the first threshold;
        change an intensity of the first color or the second color based on a degree of change of the first market data;
        receive the signal from the circuitry;
        receive second market data when the signal is received; and
        display the second market data on the first surface of the at least three surfaces.

2. The display device of claim 1, wherein the circuitry is further configured to detect tactile contact of a user with at least one surface of the at least three surfaces and to activate at least one surface of the at least three surfaces to illuminate or display data in response to the tactile contact.

3. The display device of claim 1, wherein the circuitry is further configured to detect a wireless signal from an electronic device and to activate at least one surface of the at least three surfaces to illuminate or display data in response to the wireless signal.

4. The display device of claim 1, wherein the processor is further configured to display the first market data or the second market data upon receiving an authentication token from an electronic device.

5. The display device of claim 1, wherein the processor is further configured to display the first market data or the second market data upon receiving biometric authentication.

6. The display device of claim 1, wherein the circuitry is further configured to detect when a rate of movement of the display device is at a rate above a second threshold and change data displayed on the first surface of the at least three surfaces when the rate is above the second threshold.

7. The display device of claim 1, wherein the processor is configured to change data displayed on the first surface of the at least three surfaces at periodic intervals or in response to receiving a wireless signal from an electronic device.

8. The display device of claim 1, wherein the first surface of the at least three surfaces is configured to display a stock index along with (i) a first symbol of a stock market corresponding to the stock index, (ii) a second symbol for a country associated with the stock index, and (iii) a period of time until the stock market closes.

9. The display device of claim 1, wherein the first color or the second color flashes in response to a difference between a current time and a time at which a stock market closes being less than a predetermined period of time.

10. The display device of claim 1, wherein the display device is configured to vibrate or flash a displayed color or play a sound when the first market data or the second market data increases or decreases at more than a pre-programmed rate or crosses a predetermined threshold.

11. The display device of claim 1, wherein the processor is configured to illuminate the second surface and the third surface of the at least three surfaces in a pulsing light when the first market data or the second market data increases or decreases at more than a pre-programmed rate or crosses a predetermined threshold.

12. The display device of claim 1, wherein the display device is configured to send a signal to an electronic device when the first market data or the second market data increases or decreases at more than a pre-programmed rate or crosses a predetermined threshold.

13. The display device of claim 1, wherein the first surface of the at least three surfaces is configured to receive tactile input and wherein the processor is configured to display the first market data or the second market data upon entry of a password via tactile input.

14. The display device of claim 1, wherein the circuitry is configured to detect when an electronic device is within a predetermined proximity of the display device and send a second signal to the processor to display the first market data or the second market data.

15. The display device of claim 1, wherein each of the at least three surfaces is configured to display data.

16. A three-dimensional display device comprising:
   at least three surfaces, wherein at least one surface of the at least three surfaces is configured to display data;
   a receiver that receives market data;
   circuitry configured to determine a change in orientation of the display device; and
   a processor configured to:
      receive first market data;
      display the first market data on the at least one surface;
      illuminate a plurality of surfaces of the at least three surfaces in a first color when the first market data is above a first threshold;
      illuminate the plurality of surfaces of the at least three surfaces in a second color when the first market data is below the first threshold;
      change an intensity of the first color or the second color based on a degree of change of the first market data;
      receive a signal from the circuitry when there is a change in the orientation of the display device;
      receive second market data when the signal is received;
      display the second market data on the at least one surface; and
      illuminate the plurality of surfaces of the at least three surfaces in a third color based on a type of the second market data, wherein the third color is different from the first and second colors.

17. The display device of claim 1, wherein the second market data is static and the first market data is dynamic.

18. A three-dimensional display device comprising:
   at least three surfaces, wherein at least one surface of the at least three surfaces is configured to display data;
   a receiver that receives market data;
   circuitry configured to determine a change in orientation of the display device; and
   a processor configured to:
      receive first market data;
      display the first market data on the at least one surface;
      illuminate a plurality of surfaces of the at least three surfaces in a first color when the first market data is above a first threshold;
      illuminate the plurality of surfaces of the at least three surfaces in a second color when the first market data is below the first threshold;
      change an intensity of the first color or the second color based on a degree of change of the first market data;
      receive a signal from the circuitry when there is a change in the orientation of the display device;
      receive second market data when the signal is received; and
      display the second market data on the at least one surface, wherein:
      the first market data is a stock price and the first threshold is a closing price for a stock from a previous trading session, or
      the first market data is a stock index and the first threshold is a closing point for the stock index from a previous trading session.

19. The display device of claim 1, wherein:
   the first market data is a stock price and the first threshold is a closing price for a stock from a previous trading session, or
   the first market data is a stock index and wherein the first threshold is a closing point for the stock index from a previous trading session.

20. The display device of claim 1, wherein the change in orientation occurs when the display device is moved from resting on one surface of the at least three surfaces to resting on another surface of the at least three surfaces.

21. The display device of claim 1, wherein the change in orientation occurs when the display device is tilted upwards or downwards.

* * * * *